(12) United States Patent
Branch et al.

(10) Patent No.: US 8,568,125 B2
(45) Date of Patent: Oct. 29, 2013

(54) ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS

(75) Inventors: Gregory Branch, Stanwood, WA (US); Krishna Nadelia, Seattle, WA (US)

(73) Assignee: MicroGREEN Polymers Inc., Arlington, WA (US)

( * ) Notice: Subject to any disclaimer, the term of this patent is extended or adjusted under 35 U.S.C. 154(b) by 265 days.

(21) Appl. No.: 12/423,790

(22) Filed: Apr. 14, 2009

(65) Prior Publication Data

US 2009/0321974 A1 Dec. 31, 2009

Related U.S. Application Data

(60) Provisional application No. 61/044,653, filed on Apr. 14, 2008.

(51) Int. Cl.
*B29C 44/46* (2006.01)
*B29C 65/10* (2006.01)

(52) U.S. Cl.
USPC ............ 425/216; 425/215; 264/51; 156/381; 156/497; 156/500

(58) Field of Classification Search
USPC .................. 264/51, 544; 156/381, 497, 500; 425/215, 216
See application file for complete search history.

(56) References Cited

U.S. PATENT DOCUMENTS

| | | | |
|---|---|---|---|
| 4,074,841 A | | 2/1978 | Kramer et al. |
| 4,608,009 A | * | 8/1986 | Whiteside et al. ............ 425/590 |
| 4,756,091 A | | 7/1988 | Van Denend |
| 5,207,008 A | | 5/1993 | Wimberger et al. |
| 5,303,484 A | | 4/1994 | Hagen et al. |
| 5,640,784 A | | 6/1997 | Rocheleau |
| 5,723,510 A | | 3/1998 | Kabumoto et al. |
| 5,867,920 A | * | 2/1999 | Rogne et al. .................... 34/267 |
| 6,948,378 B2 | | 9/2005 | Solberg et al. |
| 2005/0035495 A1 | * | 2/2005 | Baker et al. ................... 264/318 |
| 2005/0203198 A1 | * | 9/2005 | Branch et al. ................... 521/91 |
| 2009/0035596 A1 | * | 2/2009 | Higashi ......................... 428/480 |

* cited by examiner

*Primary Examiner* — Robert J Grun
(74) *Attorney, Agent, or Firm* — Janeway Patent Law PLLC; John M. Janeway

(57) ABSTRACT

Disclosed herein are roll fed air heated flotation ovens and related thermoforming systems, assemblies, and machines that enable the corrugation-free expansion of a gas impregnated thermoplastic web passing through an oven chamber (without use of a pin-chain assembly), as well as to related methods. In an embodiment, a gas impregnated thermoplastic web is conveyed and expanded through an elongated air heated oven chamber, wherein the elongated oven chamber includes a plurality of downwardly directed heated air nozzles positioned at regular intervals along and within the upper portion of the oven chamber, and a plurality of upwardly directed heated air nozzles positioned at regular intervals along and within the lower portion of the oven chamber, but staggered apart from the downwardly directed heated air nozzles such that the gas impregnated thermoplastic material web undulates in an up and down wavelike fashion, thereby minimizing sagging, bagging, puckering, and/or buckling of the web.

10 Claims, 3 Drawing Sheets

ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS

CROSS-REFERENCE TO RELATED APPLICATIONS

This application claims the benefit of U.S. Provisional Application No. 61/044,653 filed on Apr. 14, 2008, which application is incorporated herein by reference in its entirety for all purposes.

TECHNICAL FIELD

The present invention relates generally to roll fed thermoforming ovens and, more specifically, to roll fed air heated flotation ovens and related thermoforming systems, assemblies, and machines that enable the corrugation-free expansion of a gas impregnated thermoplastic web moving through an oven chamber, as well as to methods relating thereto.

BACKGROUND OF THE INVENTION

Microcellular plastic foam refers to a polymer that has been specially foamed to thereby create micro-pores or cells (also sometime referred to as bubbles). The common definition includes foams having an average cell size on the order of 10 microns in diameter, and typically ranging from about 0.1 to about 100 microns in diameter. In comparison, conventional plastic foams typically have an average cell diameter ranging from about 100 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer superior mechanical properties at reduced material weights and costs.

The process of making microcellular plastic foams has been developed based on a thermodynamic instability causing cell nucleation (J.E. Martini, SM Thesis, Department of Mech. Eng., MIT, Cambridge, Mass. (1981)). First, a polymer is saturated with a volatile foaming agent at a high pressure. Then, by means of a rapid pressure drop, the solubility of foaming agent impregnated within the polymer is decreased, and the polymer becomes supersaturated. The system is heated to soften the polymer matrix and a large number of cells are nucleated. The foaming agent diffuses both outwards and into a large number of small cells. Put differently, microcellular plastic foam may be produced by saturating a polymer with a gas or supercritical fluid and using a thermodynamic instability, typically a rapid pressure drop, to generate billions of cells per cubic centimeter (i.e., bubble density of greater than $10^8$ cells per cubic centimeter) within the polymer matrix.

In the context of making a microcellular thermoplastic sheet from a solid gas impregnated thermoplastic sheet, the formation of microcellular bubbles is known to cause a substantial amount of in-plane and volume expansion of the plastic sheet as it is heated and becomes foamed (i.e., populated with microcellular bubbles). Indeed, the in-plane expansion ratio of typical gas impregnated thermoplastic sheets are up to about two (meaning that the in-plane area of a gas impregnated thermoplastic sheet can double as a result of microcellular foaming).

The process of heating a thermoplastic sheet to a working temperature and then forming it into a finished shape by means of heat or pressure is known as thermoforming. In the most common method of high-volume, continuous thermoforming of thin-gauge products, plastic sheet is fed from a roll or directly from an extruder into a set of indexing chains that incorporate pins, or spikes, that pierce the sheet and transport it through an oven (infrared, direct conduction, or convection) for heating to forming temperature. The heated sheet (commonly referred to as a "web") then indexes into a form station where a mating mold and pressure-box close on the sheet, with vacuum then applied to remove trapped air and to pull the material into or onto the mold along with pressurized air to form the plastic to the detailed shape of the mold. (Plug-assists are typically used in addition to vacuum in the case of taller, deeper-draw formed parts in order to provide the needed material distribution and thicknesses in the finished parts.) After a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. The sheet containing the formed parts then indexes into a trim station on the same machine, where a die cuts the parts from the remaining sheet web, or indexes into a separate trim press where the formed parts are trimmed. The sheet web remaining after the formed parts are trimmed is typically wound onto a take-up reel or fed into an inline granulator for recycling.

An exemplary thermoforming assembly in this regard is disclosed in U.S. Pat. No. 3,359,600 to Obrien et al. As disclosed in this patent, plastic web is carried by pins or clips that are attached to parallel chains that, in turn, are indexed through an oven and forming area by mechanical advancement of the chains. In this configuration, the plastic web generally sags as it expands in the oven and thus it no longer remains straight and level. As it sags, the center of the web moves closer to the bottom heating element and thus the entire web tends to heat unevenly. In addition, and as the width of the plastic web increases to accommodate larger thermoformers, the sag problem becomes even more pronounced. Indeed, it is believed that catenary sage generally grows as the square of the width of the web (meaning that for a given tension a 60 inch wide machine will have a web sag that is about 225% as much as the web sag of a comparable 40 inch wide machine). Another disadvantage of this exemplary pin-chain thermoforming system is that the attachment pins require up to about 1 inch of the plastic web width on each edge of the web (meaning that this pierced edge material is not available to make product). Yet another disadvantage is that the edges of plastic must be kept cool, otherwise the plastic will melt and the pins will pull loose (U.S. Pat. No. 3,359,600 discloses cooling the pin-chain in order to alleviate this problem).

Because the edges of the plastic web are specifically cooled (or shielded from heating) in exemplary pin-chain thermoforming systems (in order to prevent the pins from losing their grip on the plastic web), the plastic web is constrained from lengthwise expansion along its edges (in the machine direction). Thus, the plastic web not only tends to form a lengthwise "catenary sag" in the machine direction, but also tends to form "bagging" or "puckering" across the web due to the constrained linear expansion along its edges. Indeed for ordinary solid plastic webs, the thermal expansion coefficients typically range from 65-250×10$^{-6}$/° C. (N. Rao and K. O'brien, *Design Data for Plastic Engineers*, Hanser Publishers, Munich (1998)). (The coefficient of linear thermal expansion (CLTE) measures the change in length per unit length of a material per unit change in temperature; expressed as in/in/° F. or cm/cm/° C., the CLTE is used to calculate the dimensional change resulting from thermal expansion.) Thus, and for example, plastic web conveyed through a conventional 40 inch wide pin-chain thermoforming system and heated from about 21° C. to 121° C. will expand from about 0.25 inches up to about 1.0 inch.

The above-noted disadvantages associated with conventional pin-chain thermoforming systems are even further exacerbated when the plastic web is a gas impregnated thermoplastic sheet (such as those disclosed by U.S. Pat. No. 5,684,055 to Kumar et al.). For gas impregnated thermoplastic sheets, the in-plane expansion ratio are up to two times in both the cross direction and machine direction when the web is heated and expanded during bubble formation. This large in-plane expansion renders conventional pin-chain thermoforming systems impractical for heating or otherwise expanding a gas impregnated thermoplastic sheet; the concomitant problems of web sagging, bagging, puckering, buckling and/or the formation of lengthwise "corrugations" are simply too great. Indeed, there is presently no means commercially available for satisfactorily heating and expanding, on a continuous basis, a solid (unfoamed) gas impregnated thermoplastic sheet or web into a substantially flat and corrugation-free microcellular foamed thermoplastic sheet or web.

Accordingly, there is still a need in the art for new and improved thermoforming systems, assemblies, and machines that enable the corrugation-free expansion of a gas impregnated thermoplastic sheet or web, as well as to methods relating thereto. The present invention fulfills these needs and provides for further related advantages.

SUMMARY OF THE INVENTION

In brief, the present invention relates to roll fed air heated flotation ovens and related thermoforming systems, assemblies, and machines that enable the corrugation-free expansion of a gas impregnated thermoplastic web moving through an oven chamber, as well as to methods relating thereto. In one embodiment, the present invention is directed to a roll fed air heated flotation oven system for heating and expanding, in a continuous fashion, a gas impregnated thermoplastic material web into a corrugation-free foamed thermoplastic material web. In this embodiment, the roll fed air heated flotation oven system comprises: a roll of a gas impregnated thermoplastic sheet interleaved together with a gas permeable fabric sheet so as to define an interleaved roll, the interleaved roll being horizontally positioned at an interleaved roll unwind station; and an elongated air heated oven chamber proximate and adjacent to the interleaved roll unwind station, the elongated air heated oven chamber having surrounding walls, an entrance opening at one end, and an exit opening at the other end, the elongated oven chamber being configured to receive at the entrance opening, expel at the exit opening, and convey without the use of a pin-chain assembly the gas impregnated thermoplastic material sheet being continuously unwound and separated at the interleaved roll unwind station, the elongated oven chamber including a plurality of downwardly directed heated air nozzles positioned at regular intervals along and within the upper portion of the oven chamber, and a plurality of upwardly directed heated air nozzles positioned at regular intervals along and within the lower portion of the oven chamber, but staggered apart from the downwardly directed heated air nozzles such that the gas impregnated thermoplastic material sheet undulates in an up and down wavelike fashion as the gas impregnated thermoplastic material sheet is being impinged upon by a plurality of heated air streams emanating from each of the plurality of downwardly and upwardly directed heated air nozzles, the impinging heated air streams causing heating and uniform expansion of the gas impregnated thermoplastic material sheet being conveyed through the elongated oven chamber, thereby yielding the corrugation-free foamed thermoplastic material web.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is expressly provided that all of the various references cited herein are incorporated herein by reference in their entireties for all purposes.

BRIEF DESCRIPTION OF THE DRAWINGS

The drawings are intended to be illustrative and symbolic representations of certain exemplary embodiments of the present invention. For purposes of clarity, like reference numerals have been used to designate like features throughout the several views of the drawings.

DETAILED DESCRIPTION OF THE INVENTION

Figure 1:
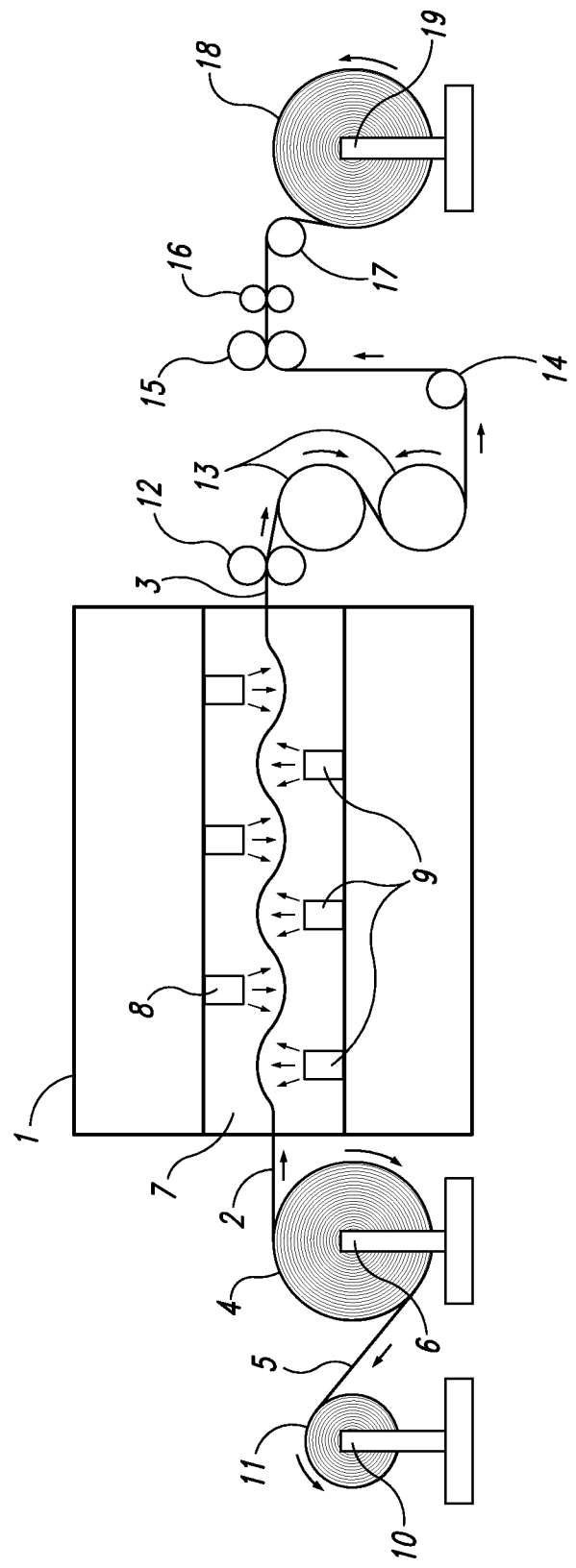
FIG. 1 illustrates a side cross-sectional schematic view of a roll fed air heated flotation oven system in accordance with an embodiment of the present invention.

Referring now to the drawings wherein like reference numerals designate identical or corresponding elements, and more particularly to FIG. 1, the present invention in one embodiment is directed to a roll fed air heated flotation oven system 1 for heating, in a continuous fashion, a gas impregnated thermoplastic material web 2 into a corrugation-free foamed thermoplastic material web 3. As shown, the roll fed air heated flotation oven system 1 comprises an interleaved roll 4 of the gas impregnated thermoplastic web 2 interleaved together with a gas permeable fabric web 5 (thereby defining the interleaved roll 4). The interleaved roll 4 is horizontally and rotatably positioned at an interleaved roll unwind support station 6. As further shown, an elongated air heated oven chamber 7 is proximate and adjacent to the interleaved roll unwind support station 6. The elongated air heated oven chamber 7 includes surrounding walls, an entrance opening at one end, and an exit opening at the other end (as generally depicted). The elongated oven chamber 7 is generally configured to receive at the entrance opening, expel at the exit opening, and convey (without the use of a pin-chain assembly) the gas impregnated thermoplastic material web 2 that is being continuously unwound and separated at the interleaved roll unwind support station 6.

The elongated oven chamber 7 includes a plurality of downwardly directed heated air nozzles 8 positioned at regular intervals along and within the upper portion of the oven chamber 7, and a plurality of upwardly directed heated air nozzles 9 positioned at regular intervals along and within the lower portion of the oven chamber 7, but staggered apart from the downwardly directed heated air nozzles 8. In this configuration, the gas impregnated thermoplastic material web 2 undulates in an up and down wavelike or sinusoidal fashion (as the gas impregnated thermoplastic material web 2 is being impinged upon by a plurality of staggered heated air streams emanating from each of the plurality of downwardly and upwardly directed heated air nozzles 8, 9). The impinging heated air streams cause heating and uniform expansion of the gas impregnated thermoplastic material web 2 that is being conveyed through the elongated oven chamber 7, thereby yielding the corrugation-free foamed thermoplastic material web 3.

As shown, the roll fed air heated flotation oven system 1 further comprises a fabric web rewind support station 10 proximate and adjacent to the interleaved roll unwind station 6. The rewind station 10 is configured to rewind the gas permeable fabric web 2 into a fabric roll 11 while the interleaved roll 4 is being unwound and separated into the gas permeable fabric web 5 and the gas impregnated thermoplastic web 2. As further shown, a nip roller assembly 12 is proximate and adjacent to the exit opening of the elongated oven chamber 7. The nip roller assembly 12 is configured for tensioning and conveying the gas impregnated thermoplastic material web 2 that is being heated and expanded within the elongated oven chamber 7. Next, one or more chiller rolls 13 are located proximate and adjacent to the nip roller assembly 12. The one or more chiller rolls 13 (set to about 45° F.) are configured to cool the substantially flat and corrugation-free foamed thermoplastic material web 2 (thereby arresting further in-plane and volume expansion).

As further shown, a sensing roll 14 redirects the moving corrugation-free foamed thermoplastic material web 2 to an idler roll assembly 15 that is proximate and adjacent to the one or more chiller rolls 13 and the sensing roll 14. The idler roll assembly 15 facilitates the conveying of the gas impregnated thermoplastic material web 2 through the elongated air heated oven chamber 8 and next to the one or more chiller rolls 14. A foamed thermoplastic web winding station 19 is positioned proximate and adjacent to the idler assembly 15. The web winding station 19 is configured to wind the foamed thermoplastic web 3 into a foamed thermoplastic material roll 18. Finally, an optional edge slitting system 16 and a lay on roll 17 are provided to trim the edges of the moving corrugation-free foamed thermoplastic material web 2 and to facilitate the winding of the foamed thermoplastic material roll 18.

Figure 2:
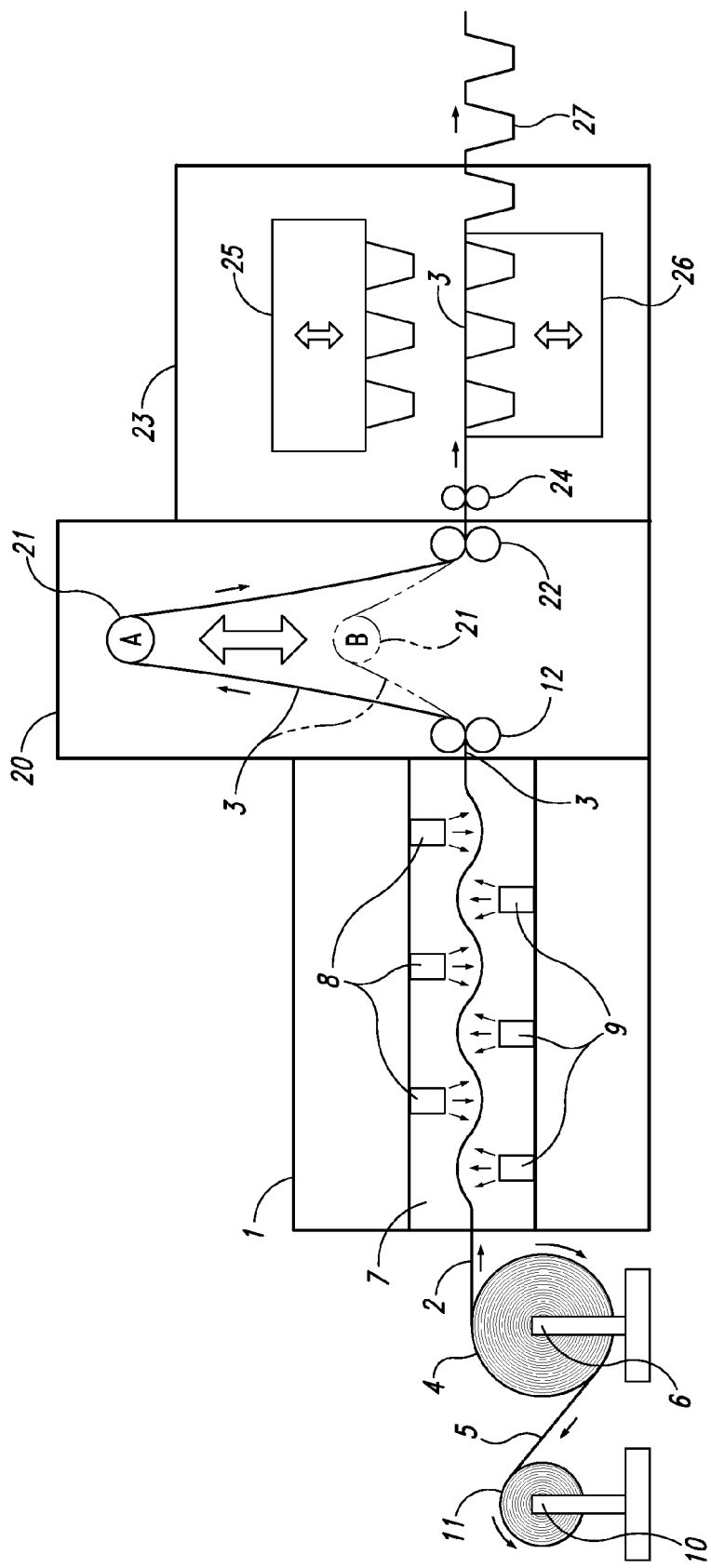
FIG. 2 illustrates a side cross-sectional schematic view of a roll fed air heated flotation oven system coupled to a thermoformer assembly, wherein a heated enclosure houses a dancer roll assembly for web accumulation in accordance with an embodiment of the present invention.
Figure 3:
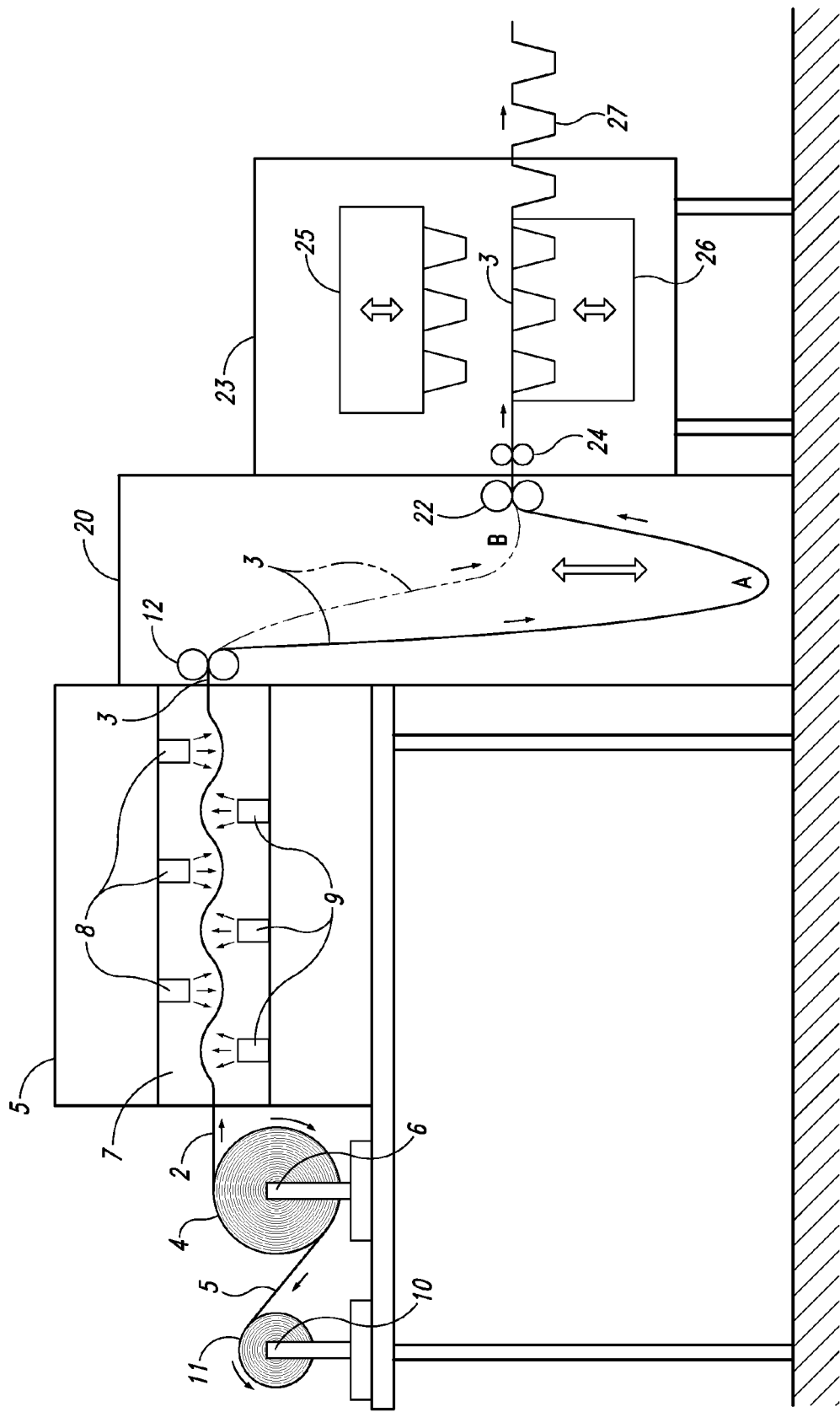
FIG. 3 illustrates a side cross-sectional schematic view of a roll fed air heated flotation oven system coupled to a thermoformer assembly, wherein a heated enclosure houses a gravity web accumulation system in accordance with an embodiment of the present invention.

In another embodiment and with reference to FIGS. 2 and 3, the present invention is directed to a thermoforming system (generally depicted) that comprises a roll fed air heated flotation oven system 1 coupled to a thermoformer assembly 23. In this embodiment, the oven system 1 is configured for heating and expanding, in a continuous fashion, a gas impregnated thermoplastic web 2 into a corrugation-free foamed thermoplastic web 3, whereas the thermoformer assembly 23 is configured for shaping, in an intermittent fashion, the corrugation-free foamed thermoplastic web 3 into one or more shaped objects 27. The thermoforming system further comprises (1) a roll of a gas impregnated thermoplastic web 2 interleaved together with a gas permeable fabric web 5 so as to define an interleaved roll 4 (having essentially the same configuration as described above in the context of the first embodiment); (2) an elongated air heated oven chamber 7 (having essentially the same configuration as described above in the context of the first embodiment); and (3) a heated enclosure 20 having therein (i) a nip roller assembly 12 for tensioning the gas impregnated thermoplastic material web 2 that is being continuously conveyed, heated, and expanded through the elongated oven chamber 7, and (ii) a foamed thermoplastic material web accumulation system (generally depicted) for accumulating the foamed thermoplastic material web 3 prior to its intermittent advancement into the thermoformer assembly 23.

As shown in FIG. 2, the foamed thermoplastic material web accumulation system (generally depicted) may comprise a dancer roll assembly 21, wherein a dancer roll 21 is vertically movable between upper and lower positions. In this configuration, the foamed thermoplastic material web 3 may accumulate prior to its intermittent advancement into the thermoformer assembly 23. As shown in FIG. 3, the foamed thermoplastic material web accumulation system (generally depicted) may, in an alternative embodiment, comprise a gravity web accumulation system that likewise allows for web accumulation prior to its intermittent advancement into the thermoformer assembly 23. As shown in both FIGS. 2 and 3, the thermoformer assembly 23 includes opposing male and female molds 25, 26 that shape the foamed thermoplastic material web 3 into one or more shaped polymeric objects 27. In addition, and with respect to the thermoforming systems depicted in FIGS. 2 and 3, the temperature of the corrugation-free foamed thermoplastic material web 3 at the exit opening of the air heated oven chamber ($T_1$) is greater than or equal to the temperature of the corrugation-free foamed thermoplastic material web 3 within the heated enclosure ($T_2$); and the temperature of the corrugation-free foamed thermoplastic material web within heated enclosure ($T_2$) may be less than or equal to the temperature of the corrugation-free foamed thermoplastic material web at the opposing male and female molds ($T_3$). For the processing of a PET (polyethylene terephthalate) web, $T_1$ generally ranges from about 200-280° F.; $T_2$ generally ranges from about 200-250° F.; and $T_3$ also generally ranges from about 200-250° F.

In yet another embodiment, the present invention is directed to a method of making one or more shaped polymeric objects from an interleaved roll of a gas impregnated thermoplastic web interleaved together with a gas permeable fabric web. The method of this embodiment comprises at least the following steps: unwinding the interleaved roll to yield the gas impregnated thermoplastic web; conveying, in a continuous fashion, the gas impregnated thermoplastic web through an elongated air heated oven chamber, wherein the elongated oven chamber includes a plurality of downwardly directed heated air nozzles positioned at regular intervals along and within the upper portion of the oven chamber, and a plurality of upwardly directed heated air nozzles positioned at regular intervals along and within the lower portion of the oven chamber, but staggered apart from the downwardly directed heated air nozzles such that the gas impregnated thermoplastic material web undulates in an up and down wavelike fashion as the gas impregnated thermoplastic material web is being impinged upon by a plurality of heated air streams emanating from each of the plurality of downwardly and upwardly directed heated air nozzles, the impinging heated air streams causing heating and uniform expansion of the gas impregnated thermoplastic material web being conveyed through the elongated oven chamber, thereby yielding a corrugation-free foamed thermoplastic material web; accumulating the corrugation-free foamed thermoplastic material web in a heated enclosure; conveying, in an intermittent fashion, the accumulated corrugation-free foamed thermoplastic material web out of the heated enclosure and into a thermoformer; and thermoforming the corrugation-free foamed thermoplastic material web into the one or more shaped polymeric objects. In this method, the gas impregnated thermoplastic web enters the elongated air heated oven chamber at a first rate, and wherein the corrugation-free foamed thermoplastic material web exits the elongated air heated oven chamber at a first second rate, and wherein the second rate is at least about 1.25 times that of the first rate.

For purposes of illustration and not limitation, the following example more specifically discloses exemplary process steps and actual experimental data associated with the making of a corrugation-free foamed thermoplastic material sheet.

EXAMPLE

An interleaved roll having a wound solid polymer of PET (polyethylene terephthalate) web with a thickness of about 0.035 inches and width of about 12 inches was impregnated with $CO_2$ to a gas concentration of about 6% by weight. The interleaved roll was unwound and the PET web component was fed into a conventional Brown Model C-2100 thermoformer with an infrared oven assembly (Brown Machine, LLC, U.S.A.). The PET web expanded upon heating, but in so doing it formed lengthwise corrugations, and exhibited some sagging, puckering and bagging throughout (believed to be caused by the constrained expansion of the web). Accordingly, a modified roll fed air heated flotation oven (about 20 feet in length) was constructed in a manner as disclosed herein. The modified roll fed air heated flotation oven (set at about 280° F.) was able to heat and expand the same PET web into a substantially flat and corrugation-free foamed thermoplastic web. The linear feed rate of the PET web into the flotation oven was about 50 ft/min, whereas the linear feed rate of the PET web exiting the flotation oven was about 75 ft/min (increase in rate due to the web expansion). In addition, the PET expanded in width from about 12 inches at the entrance to the flotation oven to about 18 inches at the exit of the flotation oven, and increased in thickness to about 0.070 inches (with a 20% relative density).

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A thermoforming system, comprising:
an oven system for continuously generating a sheet of microcellular foamed material from a sheet of gas-impregnated thermoplastic material by heating the sheet of gas-impregnated thermoplastic material and allowing the sheet to expand unconstrained to at least 1.25 times its area, the oven system comprising:
an oven chamber having an entrance opening and an exit opening,
a plurality of downwardly directed air nozzles disposed in the oven chamber, that, while the material moves from the entrance opening toward the exit opening, expels hot air to suspend the material in the oven chamber, and heats the material to a temperature that causes the gas in the material to form bubbles,
a plurality of upwardly directed air nozzles disposed in the oven chamber, that, while the material moves from the entrance opening toward the exit opening, expels hot air to suspend the material in the oven chamber, and heats the material to a temperature that causes the gas in the material to form bubbles;
a thermoformer assembly for sequentially thermoforming subsequently adjacent portions of the sheet of the microcellular foamed material generated in the oven system; and
an accumulation system for collecting the microcellular foamed material leaving the exit opening of the oven chamber before the microcellular foamed material enters the thermoformer assembly, the accumulation system comprising:
an enclosure disposed between the oven system's exit opening and the thermoformer assembly and attached to the oven system, the enclosure having an interior;
a nip roller, disposed in the interior and adjacent the oven system's exit opening, for tensioning the gas-impregnated thermoplastic material as the material moves through the oven chamber;
another nip roller, disposed in the interior and adjacent the thermoformer assembly; and
a heater for keeping the microcellular foamed material warm in the enclosure's interior.

2. The thermoforming system of claim 1 wherein the accumulation system also includes one or more chiller rolls disposed in the enclosure's interior proximate and adjacent to the exit opening, the one or more chiller rolls being configured to cool the material so as to arrest bubble formation in the material.

3. The thermoforming system of claim 1 wherein the accumulation system further comprises a dancer roll assembly.

4. The thermoforming system of claim 1 wherein the accumulation system further comprises a gravity web accumulation system.

5. The thermoforming system of claim 1 wherein the thermoformer assembly comprises opposing male and female molds.

6. The thermoforming system of claim 1 wherein the temperature ($T_1$) of the material at the exit opening of the oven chamber is greater than or equal to the temperature ($T_2$) of the material within the heated enclosure.

7. The thermoforming system of claim 1 further comprising a roll of a gas-impregnated thermoplastic material interleaved together with a gas-permeable material so as to define an interleaved roll, the interleaved roll being positioned at an interleaved roll unwind station adjacent the entrance opening of the oven chamber.

8. The thermoforming system of claim 7 further comprising a gas-permeable material rewind station proximate and adjacent to the interleaved roll unwind station, the rewind station being configured to rewind the gas-permeable material while the interleaved roll is being unwound and separated into the gas-permeable web and the gas impregnated thermoplastic web.

9. The thermoforming system of claim 1 wherein the speed of the gas-impregnated thermoplastic material as it passes through the entrance opening of the oven system's oven chamber is less than the speed of the microcellular foamed material as it passes through the exit opening of the oven system's oven chamber.

10. The thermoforming system of claim 1 wherein the temperature of the sheet of microcellular foamed material is 160-350 degrees F, and the temperature of the portion of the sheet of microcellular foamed material being thermoformed is 80-350 degrees F.

\* \* \* \* \*